United States Patent [19]

Baimbridge et al.

[11] 3,925,169
[45] Dec. 9, 1975

[54] ACTIVE GRIGNARD ELECTRODE AND PROCESS

[75] Inventors: Charles L. Baimbridge, Sweeny; James R. Minderhout, Lake Jackson; Robert W. Bearman, Lake Jackson; Donald E. Carpenter, Lake Jackson, all of Tex.

[73] Assignee: Nalco Chemical Company, Oak Brook, Ill.

[22] Filed: Mar. 19, 1973

[21] Appl. No.: 342,346

[52] U.S. Cl............. 204/1 T; 204/59 L; 204/195 F
[51] Int. Cl.².................. G01N 27/46; C25B 3/12
[58] Field of Search................ 204/1 T, 59 L, 195 F

[56] References Cited
UNITED STATES PATENTS

| | | | |
|---|---|---|---|
| 2,977,293 | 3/1961 | Ingold | 204/1 T |
| 3,007,858 | 11/1961 | Braithwaite | 204/59 L |
| 3,190,826 | 6/1965 | Fricke | 204/195 F |
| 3,409,518 | 11/1968 | Braithwaite | 204/59 L |

*Primary Examiner*—T. Tung
*Attorney, Agent, or Firm*—John G. Premo; John S. Roberts

[57] ABSTRACT

The method of continuously monitoring the concentration of Grignard reactant in the "Freeport Process" cell for producing organolead compounds which comprises utilizing a reference half cell consisting of an electrode in anhydrous ether solution with a platinum group sample electrode in a solution of process Grignard reactant and adjusting upwardly the concentration of Grignard when it falls below a value of 0.02M. Also included in the invention are preferred reference half cells utilizing lead and zinc in anhydrous solvent selected from glycol diethers, such as diethylether of tetraethylene glycol (DETEG) and optionally tetrahydrofuran (THF) as a stripping solvent.

6 Claims, 1 Drawing Figure

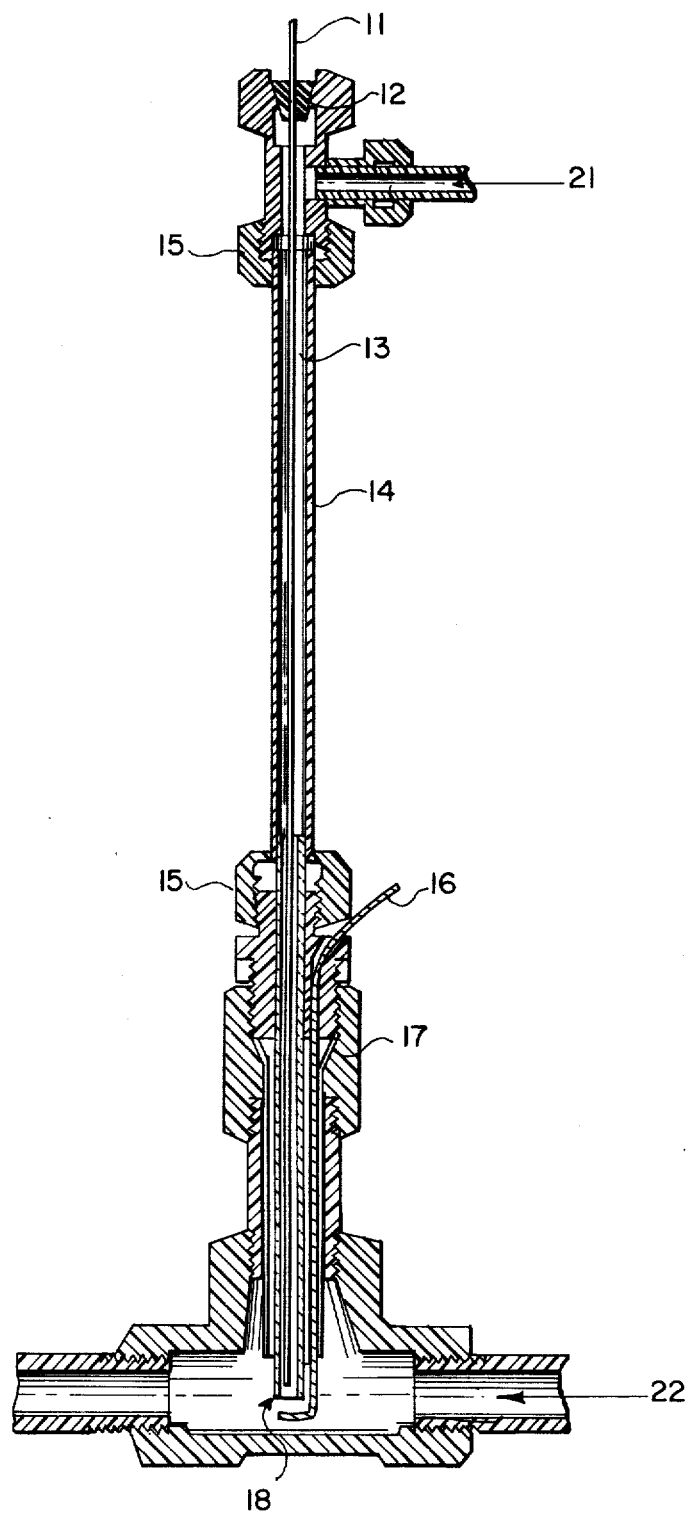

ACTIVE GRIGNARD ELECTRODE AND PROCESS

The present invention relates to a specific adjective feature in a continuous process for manufacturing organolead compounds. This process, known commercially as the Nalco Electrolytic Process or as the Freeport Process, is based on the electrolysis of a solution of methyl magnesium chloride and excess methyl chloride with lead metal as a sacrificial anode. The general electrolytic reaction may be represented by the following equation where a generalized R is substituted for methyl:

$$2RMgCl + 2RCl + Pb \rightarrow R_4Pb + 2MgCl_2$$

In this reaction, ether solvents are used in an anhydrous setting and such solvents as tetrahydrofuran (THF) and diethylene diglycol dibutyl ether and the diethylether of tetraethylene glycol (DETEG). A preferred solvent for the reaction is THF/DETEG 60:40, and a normal input concentration for the Grignard reagent is 1.5M.

The so-called Freeport Process is described in a number of patents, including U.S. Pat. No. 3,409,518 Braithwaite, and also in Encyclopedia of Chemical Technology II, Volume 12, pages 292–293, 1967. In this process one cause of concern at the plant has been the fact that the sacrificial lead anode and the metal cathode are placed in juxtaposition with a narrow separation gap so that if the concentration of Grignard falls below a minimum limit in the range of 0.01–0.02, there is a possibility of a short circuit with consequent damage to the electrodes and to process efficiency. It was, therefore, a purpose of this invention to provide a monitoring system to monitor the concentration of Grignard in the process cell so that when it delimited the lower value in the area of 0.02, the Grignard concentration in the process cell would be adjusted upwardly to safe and effective concentrations for the process.

The present invention utilizing either of two preferred half cells is connected directly to a source of cell effluent and measures the conductivity of said effluent from a normal range of 1.5M down to 0.02M Grignard. During this operational range, the calculation or graph of the concentration is measured against potential difference in mV in the preferred reference half cell. This reference half cell is connected to a conventional precious metal sample electrode. The result displays a slope which may be reproduced in graph form of so-called Nernstian values or straight line or lines according to the Nernst equation:

$$E = (0.059/n) \log C/k$$

$E$ = potential difference, expressed in volts, between the metal and its ions
$n$ = valence change of the metal
$C$ = ionic concentration
$k$ = equilibrium concentration of ions It has been found that at or below a concentration of 0.02M, the potential differences no longer gives linear Nernstian values. Thus, the results may be and were measured on a Nernstian slope graph which gives linear values from readings of 1.5M of Grignard down to 0.02M where electronically a signal is given to restore the Grignard concentration to 1.5M in the Freeport cell.

Two preferred half cell arrangements have been utilized. In one preferred half cell, a Pb° wire/PbCl₂ doped reference solution was utilized where the doping consisted of a minor amount 0.015M PbCl₂ and the reference solution was an anhydrous ether selected from one or more of the group consisting of tetrahydrofuran (THF) and glycol diethers such as the diethylether of tetraethylene glycol (DETEG).

The complete cell system configuration appears as follows:

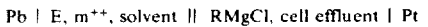

where $E$ is the base electrolyte and $m$ is a metal whose ions will be reduced by Grignard reagent. Such a half cell, when coupled with sample cell effluent yields a potential which is quantitatively related to [RMgCl].

A more restricted configuration also appears below:

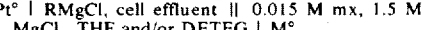
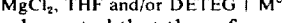

It is to be noted that the reference solution was anhydrous and the magnesium chloride was prepared as by bubbling anhydrous HCl through a solution of a process Grignard feed.

It was further found that the presence of the chloride anion in the reference solution produced the best results and in the same manner as the illustrative examples showing lead above, a Zn°/ZnCl₂ doped solution electrode was prepared and utilized. In particular, zinc reference solution half cells displayed superior results as to reproducibility and lack of seepage of solution through the frit.

THE REFERENCE SOLUTION

In the Freeport cell, ethers are used as a solvent and in general a glycol diether can be utilized, such as the diethylether of diethylene glycol, the diethylether of triethylene glycol, the diethylether of tetraethylene glycol (DETEG), and the diethylether of pentaethylene glycol. Tetrahydrofuran (THF) may optionally be added as a stripping solvent.

The electrolyte in the reference solution was selected to have a concentration of MgCl₂ which is close to or equal to the molarity of the feed in the Grignard solution. Thus, a 1.5M anhydrous MgCl₂ solution is preferably utilized. In order to provide electrolyte in the reference solution, one of two measures was utilized. Where the preferred zinc and lead electrodes were used, a small amount of related zinc chloride or lead chloride was used to provide electrolyte. Also, in the plug or frit between the two electrodes which is normally made of powdered glass, a certain or small amount of inorganic ions reducible by Grignard such as again zinc chloride or lead chloride were pressed into the glass which makes a less porous frit but still suitable for the passage of current. The anhydrous magnesium chloride solution for the reference half cell was prepared synthetically in the lab or utilized by bubbling anhydrous HCl through a solution of Grignard feed which is already of the proper molarity; i.e., 1.5M.

Reference is made to FIG. 1 of the attached drawing which is a schematic view of a probe-type reference electrode and the reference symbols are as noted:

11 — Reference electrode
12 — Rubber plug
13 — Reference solution compartment
14 — ½ inch OD polymer tubing
15 — Nylon fittings
16 — Pb counter electrode
17 — Polymer/Teflon insulation
18 — Fritted glass
21 — N₂ pressure (30 psi)
22 — Effluent FIG. 1 shows the utilization of a lead counter electrode 16 and reference electrode 11 separated by fritted glass bridge means 18 developing a charge as the effluent 22 passes between the electrodes. Fritted glass 18 has composited with it small particles of $PbCl_2$ to effect the completion of the circuit reference compartment metal 11 and electrode 16, and the device proceeds to monitor the Grignard effluent 22 from the Freeport cell (not shown). A suitable electronic device turns on input of fresh 1.5M Grignard reagent such as $CH_2MgX$ when the concentration depletes to 0.02M and restores this concentration to 1.5M as measured by cell effluent.

ELECTRODES

The preferred electrodes have been described supra and in addition to the zinc and lead electrodes or probes described, experiments were made utilizing platinum and silver as the reference electrodes. In the cases of these latter two, difficulties were encountered due to poor reproducibility. In the case of the silver, technical difficulties developed in that the $Ag^+$ in the reference solution was reduced by active Grignard contact and electroplating occurred in the frit. It is noted that inert gas, such as nitrogen, is required in conjunction with the reference electrode section of the probe.

EXAMPLE I

A $Pb°$ wire/$PbCl_2$ doped reference solution was prepared and utilized as in the apparatus shown in FIG. 1. Using $Pb°$ wire/1.5M Grignard feed solution as reference solution, the Grignard concentration was monitored from 1.5M to 0.02M. The drop in potential was Nernstian or slopewise until the region 0.02M to 0.01M where there was a large potential drop of several hundred millivolts for that decade drop in concentration on the mV meter. It was also observed that the drop in the effective monitoring range was about 60 mV per decade change. It was believed that any Grignard reduced in the cell formed a soluble alkyllead compound and thus afforded an additional advantage in utilization of lead.

EXAMPLE II

A $Zn°/ZnCl_2$ doped reference solution electrode was formulated in a manner similar to the lead electrode of Example I but modified with substitution of Zn metal in the reference electrode compartment. This electrode was tested for applicability in monitoring the cell effluent from a Freeport tetramethyllead cell and after 1 month gave good reproducibility, good dV/dM, and no frit failures under normal positive reference side pressure.

We claim:

1. A method of continuously monitoring the concentration of Grignard reactant in a Freeport Process cell for producing organolead compounds which comprises measuring the potential drop between a reference half cell comprising an electrode selected from the group consisting of lead and zinc metal in anhydrous ether solution and a platinum group sample electrode in process Grignard reactant coupled to said reference half cell through a bridge means.

2. The method according to claim 1 wherein the concentration is measured as a Nernstian slope graph from about 1.5M–0.02M and adjusting upwardly the Grignard concentration in the process cell when said concentration delimits to a value of $\leq$ 0.02M.

3. The method according to claim 1 wherein the reference half cell is $PbCl_2$, 1.5M $MgCl_2$, anhydrous solvent/$Pb°$.

4. The method according to claim 3 wherein the anhydrous solvent is selected from at least one of the group consisting of THF and DETEG.

5. The method according to claim 1 wherein the reference half cell is $ZnCl_2$, 1.5 $MgCl_2$, anhydrous solvent/$Zn°$.

6. The method according to claim 5 wherein the anhydrous solvent is selected from the group consisting of THF and DETEG.

* * * * *